Patented Nov. 5, 1940

2,220,134

UNITED STATES PATENT OFFICE 2,220,134

PROCESS FOR THE MANUFACTURE OF FERTILIZERS

Charles Samuel Townsend, London, England, assignor to Wellesley Holdings Limited, London, England, a British company No Drawing. Application January 8, 1938, Serial No. 184,028. In Great Britain January 11, 1937

1 Claim. (Cl. 71—9)

This invention relates to a process for the manufacture of fertilizers and it has for its object to convert sewage sludge into a fertilizer having a dry and fibrous form whereby the same is readily applied to the soil and which also has a high humus and humic acid content.

A process according to the present invention broadly comprises the steps of first preparing a fibrous mixture from sewage sludge and one or more absorbent cellulosic materials in such a manner as to produce a divided material of a fibrous, fluffy character composed principally of sewage sludge, secondly allowing the mixture to ferment by encouraging the propagation therein of aerobic bacteria, and, finally, subjecting the fermenting mass to oxidation and dehydration to produce a loosely fibrous and substantially dry product.

As examples of fibrous, absorbent cellulosic materials which may satisfactorily be employed in the above process there may be mentioned, raw fibrous cellulosic material, fibre pulp, paper, cardboard or peat, preferably air-dried peat, or mixtures thereof.

To ensure that the mixture to be treated shall have the desired fibrous, and divided character, it is necessary that the cellulosic material be teased, opened up or loosened sufficiently to separate the material and thereby make the same fluffy and preferably this treatment is effected after admixture with the sewage sludge, and either previous to or during fermentation, since, in this way, the harder forms of cellulosic material are more easily broken down and the required absorption of the sewage sludge by the cellulosic material is expedited.

If undue acidity is likely to be developed during fermentation an alkaline material, such for example as hydrated lime, is added to the mixture so as to secure that the final product has a pH value of about 7.4.

A further addition of a suitable material for example, calcium sulphate, may be added to fix the evolved ammoniacal vapours.

Any suitable carbohydrate nutrient may be used to encourage bacterial action, such, for example, as sugar-beet tailings and like carbohydrate containing waste products.

Fermentation by the aerobic bacteria present in the sewage sludge is preferably carried out in fermentation pits in the presence of the contained air. In this way it is possible to ensure that sufficient oxygen is available for the aerobic bacteria to propagate rapidly thereby bringing about rapid completion of the fermentation process.

The invention is not however limited to any particular form or type of apparatus the only essential being that it shall be suitable for carrying out the process in as short a time as possible. For example instead of using fermentation pits to produce fermentation this step in the process may be effected in an apparatus such as is described in the specification of application No. 165,977 for carrying out the aerobic stage in the therein described process.

Similarly the oxidizing step in the process according to the present invention may be carried out with any suitable form of apparatus. One suitable apparatus for this purpose however, may comprise a tunnel having an agitating conveyor mechanism for traversing the fermenting material through the tunnel and it is yet a further feature of the invention that the said tunnel is divided into a number of sections, and that the conveyor mechanism of each successive section is operated at a higher speed than in the preceding section. During the passage of material through this tunnel, an adequate supply of air is passed through the tunnel to effect oxidation and dehydration of the material; preferably the air-flow is in the opposite direction to that of the material.

In one method of carrying out the invention 10 tons of cellulosic material which may comprise waste paper or a mixture of equal parts of waste paper and peat moss litter is impregnated with 50 tons of sewage sludge and the mass is thoroughly mixed until the sewage has been absorbed. The fibre becomes very open and both the water and the colloidal solids are absorbed into the interstices in the mass in intimate contact therewith. The mixed mass is now allowed to ferment in pits for 72 hours or more. The mixture is then teased, opened up or loosened in a machine which operates to tear the cellulosic material so that it may retain its fibrous character, thereby ensuring that it shall have a good water-retaining capacity which is an essential factor in a humus fertilizer. It is essential that the end product should not be ground to destroy its fibrous formation. If it be desired to have a higher nitrogen, potash and phosphoric acid content in the final product, pressed sewage sludge cake, quantity according to the final desired analysis, may be added during the loosening and mixing period. The addition at this stage ensures the pressed sewage sludge being worked into the fibrous matter.

In order to provide a nutrient to assist in bacterial development, a carbohydrate-containing material may be added to the mixture and the mass rendered slightly alkaline, therefore 56 lbs. of bacterial nutrient preferably sugar-beet tailings whenever these are available, is added together with 1 cwt. of hydrated lime and to fix the ammoniacal vapours 2 cwts. of calcium sulphate are also added to the mass.

The carbohydrate and calcium mixture is distributed throughout the sewage-containing mass as evenly and thoroughly as possible and the mass is then allowed to stand for a period up to about 72 hours during which time the bacteria propagate and active fermentation proceeds accompanied by a rise in temperature.

When this stage has proceeded for a suitable time the mass is fed into a tunnel fitted with agitating conveyor worms and air under pressure is forced through the agitated mass for the purposes of providing a suitable atmosphere for the bacteria, oxidizing the material and completing the dehydration of the mass. The tunnel is divided into three sections, in the first of which the conveying worm operates slowly, whilst in each of the two succeeding sections the speed at which the worm is operated is increased three-fold compared with the preceding section.

During the passage of the material through the several sections of the tunnel, the fermentation process is completed and the material is delivered from the end of the tunnel in a substantially dry state and in a loose fibrous condition. The fertilizer produced by the process described contains substantially all the plant nutrients originally present in the material and also those formed during fermentation and as it also has a high humus and humic acid content and a considerable water-holding capacity it is extremely valuable as a soil-enricher.

What I claim is:

Process for the production of a dry fibrous fertilizing material from sewage sludge comprising the steps of converting the sewage sludge from a semi-liquid to a porous mass by incorporating with the sewage sludge an organic fibrous absorbent material in quantity sufficient to absorb the free liquid from the sewage sludge causing the porous mixture to ferment under aerobic conditions when in a pit or cell, allowing said fermentation to proceed for at least 72 hours until an elevated temperature within the mass is attained and partial fermentation is effected, removing and loosening the mass, passing the same countercurrent to air while agitating on a travelling conveyor and increasing the speed thereof as oxidation and dehydration of the mass proceeds thereby producing a dry fibrous product.

CHARLES SAMUEL TOWNSEND.